United States Patent
Byun

(10) Patent No.: US 8,369,771 B2
(45) Date of Patent: Feb. 5, 2013

(54) METHOD AND APPARATUS FOR SYNCHRONIZING DIGITAL MULTIMEDIA BROADCASTING BETWEEN TERMINALS

(75) Inventor: Ki-Jong Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 12/623,152

(22) Filed: Nov. 20, 2009

(65) Prior Publication Data
US 2010/0131972 A1 May 27, 2010

(30) Foreign Application Priority Data
Nov. 21, 2008 (KR) .................. 10-2008-0116145

(51) Int. Cl.
*H04H 20/71* (2008.01)
(52) U.S. Cl. .................. 455/3.01; 455/3.05; 455/414.1; 455/517; 725/25
(58) Field of Classification Search .................. 455/3.01, 455/3.02, 450, 451, 452.1, 502, 509, 515, 455/516, 76, 77, 154.1, 154.2, 179.1, 283; 709/248, 228, 229; 707/9, 10, 100, 203, 707/205
See application file for complete search history.

(56) References Cited

U.S. PATENT DOCUMENTS

| | | | |
|---|---|---|---|
| 7,610,011 B2 * | 10/2009 | Albrett | 455/3.04 |
| 2005/0256870 A1 * | 11/2005 | Benco et al. | 707/9 |
| 2006/0212902 A1 * | 9/2006 | Seo et al. | 725/39 |
| 2007/0280138 A1 * | 12/2007 | Stern | 370/254 |
| 2008/0085682 A1 * | 4/2008 | Rao | 455/74 |
| 2008/0209075 A1 * | 8/2008 | Shamma | 709/248 |
| 2009/0197618 A1 * | 8/2009 | Ko et al. | 455/456.3 |

FOREIGN PATENT DOCUMENTS
KR 10-2007-0091959 A 9/2007

* cited by examiner

*Primary Examiner* — Jean Gelin
(74) *Attorney, Agent, or Firm* — Jefferson IP Law, LLP

(57) ABSTRACT

A method and apparatus for synchronizing Digital Multimedia Broadcasting (DMB) are provided. An operation method of a first Mobile Station (MS) for synchronizing DMB includes sending a broadcast channel synchronization request message to a second MS, receiving a broadcast channel synchronization request grant message from the second MS, after broadcast channel synchronization, receiving information on a broadcast channel viewed by the second MS, tuning to the broadcast channel viewed by the second MS based on the broadcast channel information received from the second MS, and displaying the broadcast channel viewed by the second MS.

40 Claims, 9 Drawing Sheets

METHOD AND APPARATUS FOR SYNCHRONIZING DIGITAL MULTIMEDIA BROADCASTING BETWEEN TERMINALS

PRIORITY

This application claims the benefit under 35 U.S.C. §119 (a) of a Korean patent application filed in the Korean Intellectual Property Office on Nov. 21, 2008 and assigned Serial No. 10-2008-0116145, the entire disclosure of which is hereby incorporated by reference.

BACKGROUND OF THE INVENTION

1. Field of the Invention

The present invention relates to Digital Multimedia Broadcasting (DMB). More particularly, the present invention relates to a method and apparatus for synchronizing a broadcast channel between terminals, thus enabling several users to watch the same broadcast channel and enabling a corresponding terminal to monitor a broadcast channel that is being watched.

2. Description of the Related Art

With the convergence of mobile communications and broadcasting, Digital Multimedia Broadcasting (DMB) is attracting attention and is now being supported by a variety of terminals, such as a portable phone, a Personal Digital Assistant (PDA), a navigation unit, etc. DMB is a broadcasting service for modulating a variety of multimedia signals such as voice, image, etc. into digital signals for the reproduction thereof to a user. More particularly, DMB refers to a broadcasting service for enabling a user to view a diversity of multimedia broadcasting through a portable receiver or a vehicle receiver, etc.

With the advancement in memory technology, large amounts of digital multimedia data (e.g., moving picture data, music data, video data, etc.) are now able to be stored. In addition, with the increase in popularity of mobile communication terminals in recent years, a terminal (hereinafter, referred to as a 'DMB phone') that is able to receive DMB has been developed and commercialized. Accordingly, users can view DMB using the DMB phone without restrictions in their mobility. That is, the DMB phone has a feature of enabling the users to view DMB without regard to time/place.

More particularly, the use of DMB phones for viewing educational broadcasting using the DMB phones among juveniles, etc. is increasing. However, if the juveniles view DMB without restrictions, an undesired side effect may occur. For example, the juveniles may not have sufficient time management skills and therefore may end up viewing DMB when they should be engaged in other activities, or the juveniles may view adult programs that would have an undesirable influence on them, etc. To address this problem, Korean patent application Number 10-2006-0021778 entitled "METHOD AND APPARATUS FOR DIGITAL BROADCAST VIEW LIMIT" discloses a function of transmitting a history of DMB viewing, etc. from one terminal to another terminal and managing the viewing history, and a function of controlling a viewing right of a specific terminal in another terminal.

In a conventional technology, a viewing history can be managed in a text format or can be used for the purpose of controlling a viewing right. That is, if an authentication terminal restricts the viewing of a program and a viewing limit time, a DMB phone processes DMB data depending on the program restriction and the viewing limit time. However, the authentication terminal is not aware of what program the DMB phone is presently viewing. Thus, there is a problem that, if the authentication terminal does not add a restriction to viewing a program to a corresponding list beforehand, the juveniles may view the restricted program that is not yet listed in the corresponding list through the DMB phone.

SUMMARY OF THE INVENTION

An aspect of the present invention is to address at least the above-mentioned problems and/or disadvantages and to provide at least the advantages described below. Accordingly, an aspect of the present invention is to provide a method and apparatus for synchronizing Digital Multimedia Broadcasting (DMB).

Another aspect of the present invention is to provide a method and apparatus for synchronizing DMB and allowing a plurality of Mobile Stations (MSs) to view the same DMB.

A further aspect of the present invention is to provide a method and apparatus for synchronizing DMB and monitoring DMB viewed by a corresponding MS in real-time.

The above aspects are addressed by providing a method and apparatus for synchronizing DMB.

In accordance with an aspect of the present invention, a method for broadcast channel synchronization by a first MS for synchronizing DMB is provided. The method includes sending a broadcast channel synchronization request message to a second MS, receiving a broadcast channel synchronization request grant message from the second MS, after broadcast channel synchronization, receiving information on a broadcast channel viewed by the second MS, tuning to the broadcast channel viewed by the second MS, based on the broadcast channel information received from the second MS, and displaying the broadcast channel viewed by the second MS.

In accordance with another aspect of the present invention, a method for broadcast channel synchronization by a first MS for synchronizing DMB is provided. The method includes sending a channel synchronization request message for viewing a restricted program to a second MS, receiving a broadcast channel synchronization request grant message from the second MS, after broadcast channel synchronization, receiving information on a broadcast channel viewed by the second MS, identifying if the broadcast channel viewed by the second MS includes the restricted program using the broadcast channel information of the second MS, if the broadcast channel viewed by the second MS includes the restricted program, tuning to the broadcast channel viewed by the second MS, and displaying the broadcast channel viewed by the second MS.

In accordance with a further another aspect of the present invention, a method for broadcast channel synchronization by a second MS for synchronizing DMB is provided. The method includes receiving a broadcast channel synchronization request message from a first MS, sending a broadcast channel synchronization request grant message, and after the broadcast channel synchronization, transmitting information on a broadcast channel that is being viewed to the first MS.

In accordance with a yet another aspect of the present invention, a method for broadcast channel synchronization by a second MS for synchronizing DMB is provided. The method includes receiving a broadcast channel synchronization request message from a first MS, sending a broadcast channel synchronization request grant message, after the broadcast channel synchronization, identifying a restriction level of a broadcast channel that is being viewed, after the broadcast channel synchronization, and, if the broadcast channel that is being viewed includes a restricted program, transmitting information on the broadcast channel that is being viewed to the first MS.

In accordance with a still another aspect of the present invention, an apparatus for broadcast channel synchronization in a first MS for synchronizing DMB is provided. The apparatus includes a DMB viewing manager and a DMB viewing processor. The DMB viewing manager sends a broadcast channel synchronization request to a second MS and, when the second MS grants the broadcast channel synchronization request, receives information on a broadcast channel viewed by the second MS from the second MS. The DMB viewing processor tunes to the broadcast channel viewed by the second MS using the received broadcast channel information of the second MS, and displays the broadcast channel viewed by the second MS.

In accordance with a still another aspect of the present invention, an apparatus for broadcast channel synchronization in a first MS for synchronizing DMB is provided. The apparatus includes a DMB viewing manager and a DMB viewing processor. The DMB viewing manager sends a broadcast channel synchronization request to a second MS and, when the second MS grants the channel synchronization request for a restricted program, receives the broadcast channel information from the second MS, and identifies if the broadcast channel viewed by the second MS is the restricted program using the received broadcast channel information of the second MS. When the broadcast channel viewed by the second MS is the restricted program, the DMB viewing processor tunes to the broadcast channel viewed by the second MS, and displays the broadcast channel viewed by the second MS.

In accordance with a still another aspect of the present invention, an apparatus for broadcast channel synchronization in a second MS for synchronizing DMB is provided. The apparatus includes a DMB viewing manager for, while viewing a broadcast channel, receiving a broadcast channel synchronization request message from a first MS, sending a grant message for the broadcast channel synchronization request, performing broadcast channel synchronization, and transmitting information on a broadcast channel that is being viewed.

In accordance with a still another aspect of the present invention, an apparatus for broadcast channel synchronization in a second MS for synchronizing DMB is provided. The apparatus includes a DMB viewing manager and a DMB viewing processor. The DMB viewing manager performs broadcast channel synchronization and, if a broadcast channel that is being viewed is a restricted program, transmits information on the broadcast channel that is being viewed. The DMB viewing processor identifies a restriction level of the broadcast channel that is being viewed.

In accordance with a still another aspect of the present invention, an operation method of a first MS for limiting DMB is provided. The method includes performing broadcast channel synchronization, and receiving broadcast channel information from a second MS, tuning to a broadcast channel viewed by the second MS based on the broadcast channel information and displaying the broadcast channel viewed by the second MS, and, if the broadcast channel viewed by the second MS is a restricted program, sending a broadcast restriction command message to the second MS.

In accordance with a still another aspect of the present invention, an operation method of a second MS for limiting DMB is provided. The method includes performing broadcast channel synchronization and transmitting broadcast channel information to a first MS, and upon receiving a broadcast restriction command message from the first MS, stopping the viewing a broadcast channel that is being viewed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, description of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus for synchronizing Digital Multimedia Broadcasting (DMB) according to exemplary embodiments of the present invention are described below. In the illustrated exemplary embodiments of the present invention, DMB channel synchronization refers to converting a DMB channel so that at least one or more Mobile Stations (MSs) can view a broadcast being viewed by a corresponding MS, together. Hereafter, the term "broadcast," "program," and "broadcast channel" may be used interchangeably when used in the context of content being viewed.

Figure 1:
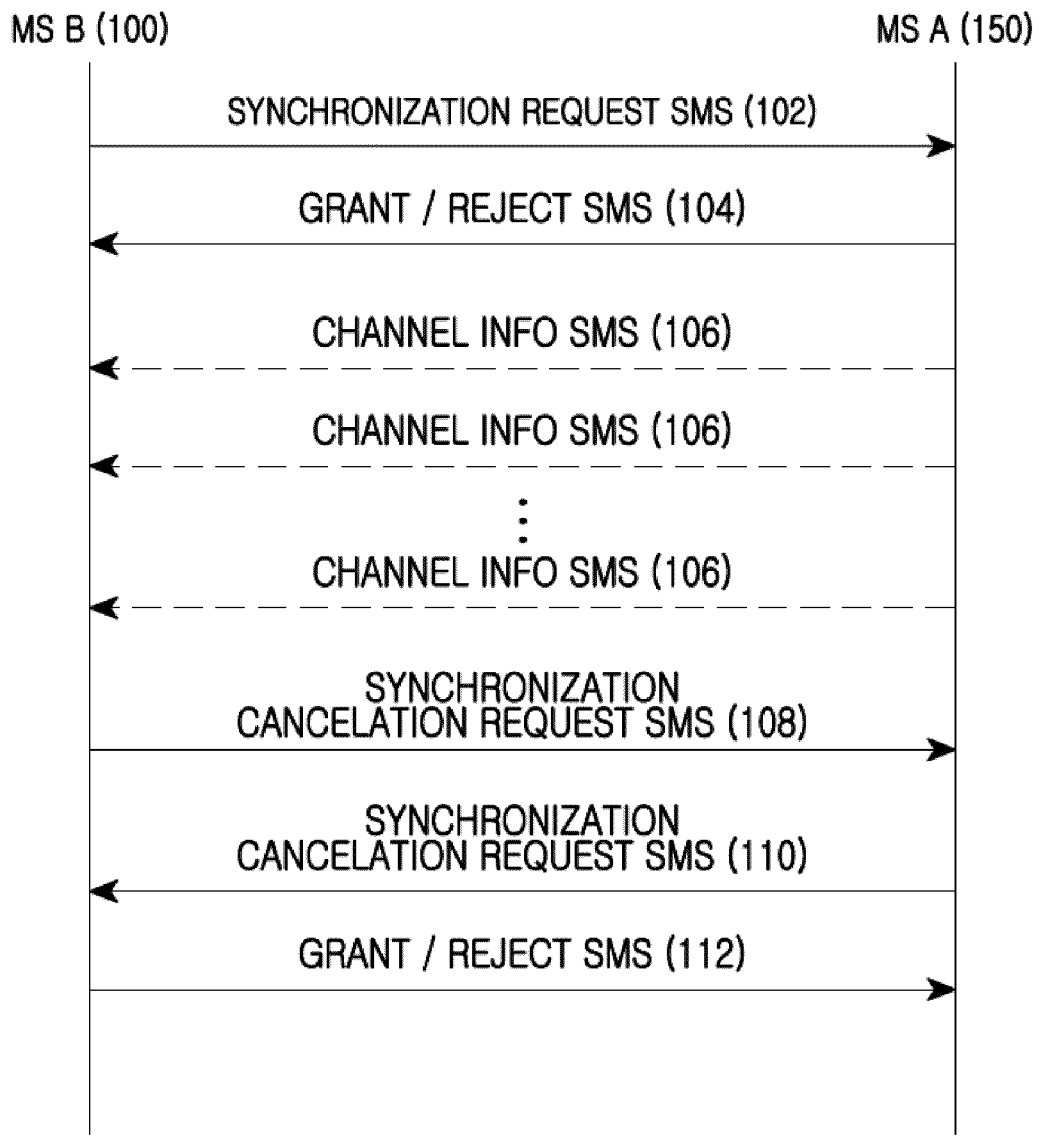
FIG. 1 illustrates a procedure for broadcast channel synchronization between two terminals according to an exemplary embodiment of the present invention.

FIG. 1 illustrates a procedure for broadcast channel synchronization between two terminals according to an exemplary embodiment of the present invention.

Referring to FIG. 1, an MS B 100 is a subject monitoring a DMB broadcast channel viewed by an MS A 150.

A procedure for broadcast channel synchronization is described below. In step 102, the MS B 100 sends a channel synchronization request Short Message Service (SMS) message to the MS A 150. The channel synchronization request SMS message includes synchronization time and period setting values, synchronization channel/view restriction setting values, etc. In step 104, the MS A 150 sends a grant/reject SMS message responsive to the channel synchronization request to the MS B 100.

Here, if the MS A 150 sends the reject SMS message responsive to the channel synchronization request to the MS B 100, the MS B 100 again sends a channel synchronization request SMS message to the MS A 150 or performs a corresponding operation (not shown) after a lapse of a preset amount of time.

On the other hand, if the MS A 150 sends the grant SMS message responsive to the channel synchronization request to the MS B 100, in step 106, the MS B 100 receives a channel information SMS message when synchronization is initiated. Further, step 106 may be repeated when there is a change of a broadcast channel viewed by the MS A 150. Accordingly, the MS B 100 may receive additional channel information SMS messages periodically and/or when there is a change of a broadcast channel viewed by the MS A 150. The channel information SMS message includes information on the broadcast channel viewed by the MS A 150. Thus, with reference to the channel information SMS message, the MS B 100 tunes to the broadcast channel viewed by the MS A 150. Thereafter, the MS B 100 views the same broadcast channel viewed by the MS A 150.

Then, in step 108, the MS B 100 sends a synchronization cancellation request SMS message while viewing the same channel viewed by the MS A 150, thereby discontinuing the viewing of the same channel viewed by the MS A 150. Here, the MS B 100 may tune to and view a different channel.

Alternatively, depending on the circumstances, in step 110, the MS A 150 may send a synchronization cancellation request SMS message to the MS B 100, thereby requesting that the viewing of the broadcast channel synchronization be canceled. Upon receiving the synchronization cancellation request SMS message, in step 112, the MS B 100 sends a grant/reject SMS message responsive to the synchronization cancellation request of the MS A 150.

Figure 2:
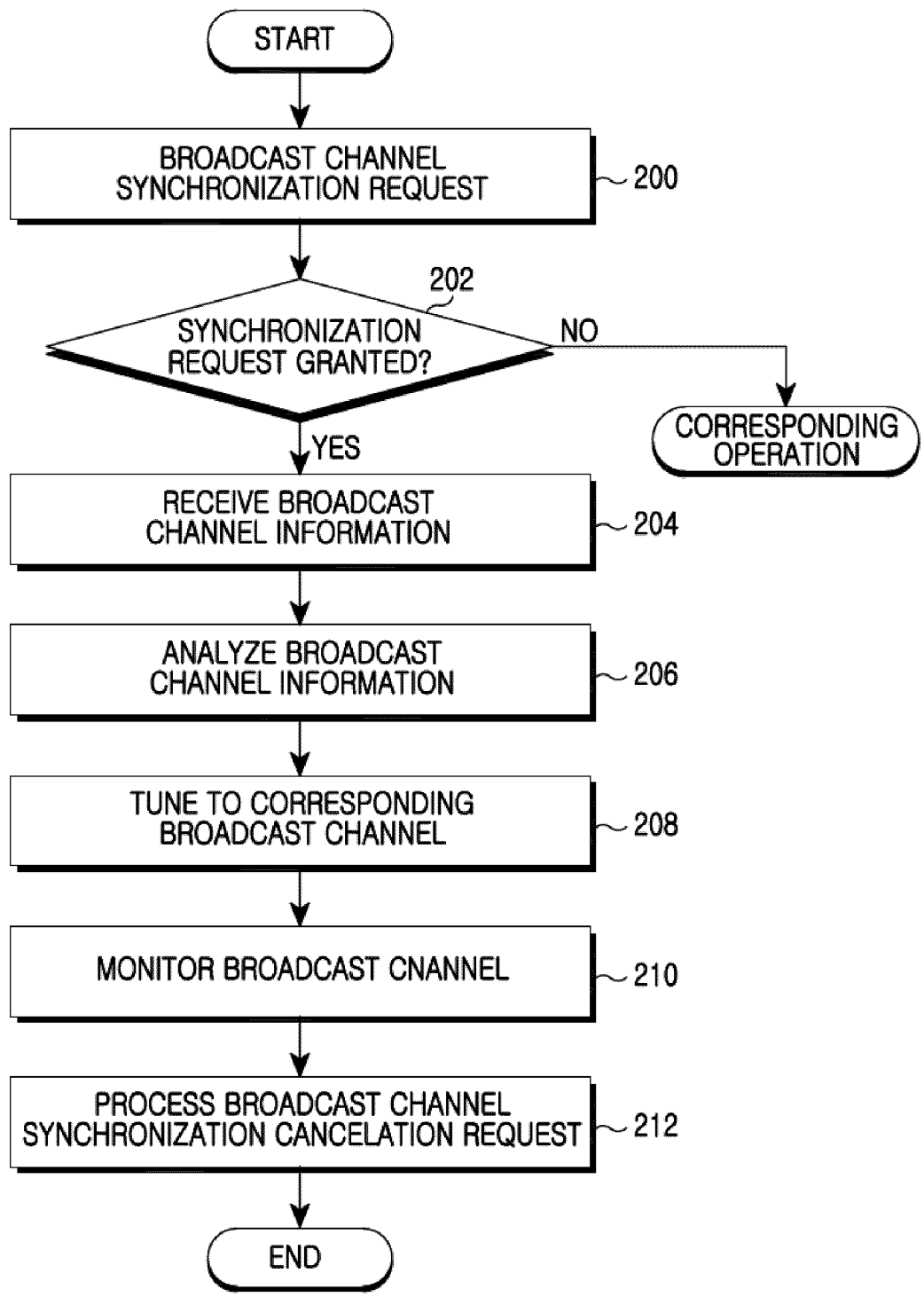
FIG. 2 illustrates an operation of a Mobile Station (MS) for broadcast channel synchronization according to an exemplary embodiment of the present invention.

FIG. 2 illustrates an operation of an MS for broadcast channel synchronization according to an exemplary embodiment of the present invention.

Referring to FIG. 2, in step 200, the MS B 100 desiring broadcast channel synchronization sends a broadcast channel synchronization request SMS message to an MS A 150 viewing a DMB broadcast channel. The broadcast channel synchronization request SMS message may include synchronization request information, a viewing restriction limit for monitoring children's viewing, a synchronization time setting value, etc. The viewing restriction limit may be a viewing age limit.

Then, if the MS A 150 grants the broadcast channel synchronization request in step 202, the MS B 100 proceeds to step 204 and receives a broadcast channel information SMS message from the MS A 150. The MS B 100 receives the broadcast channel information SMS message from the MS A 150 when synchronization is initiated. Thereafter, the MS B 100 may receive the broadcast channel information SMS message from the MS A 150 periodically and/or when there is a change of a broadcast channel viewed by the MS A 150. On the other hand, if the MS A 150 rejects the broadcast channel synchronization request in step 202, the MS B 100 performs a corresponding operation.

Then, in step 206, the MS B 100 analyzes the broadcast channel information SMS message received from the MS A 150. In step 208, the MS B 100 tunes to the broadcast channel viewed by the MS A 150.

Then, in step 210, the MS B 100 monitors the tuned broadcast channel of the MS A 150 in real-time.

Then, in step 212, the MS B 100 processes a broadcast channel synchronization cancellation request. That is, the MS B 100 may send the broadcast channel synchronization cancellation request to the MS A 150 or vice versa. Thus, when sending the broadcast channel synchronization cancellation request, the MS B 100 sends a broadcast channel synchronization cancellation request SMS message to the MS A 150, and stops receiving the broadcast channel that is being monitored.

If the MS A 150 sends a broadcast channel synchronization cancellation request, the MS B 100 receives a broadcast channel synchronization cancellation request SMS message from the MS A 150, and in response, sends a grant/reject SMS message to the MS A 150.

Then, the MS B 100 terminates the procedure according to an exemplary embodiment of the present invention.

Figure 3:
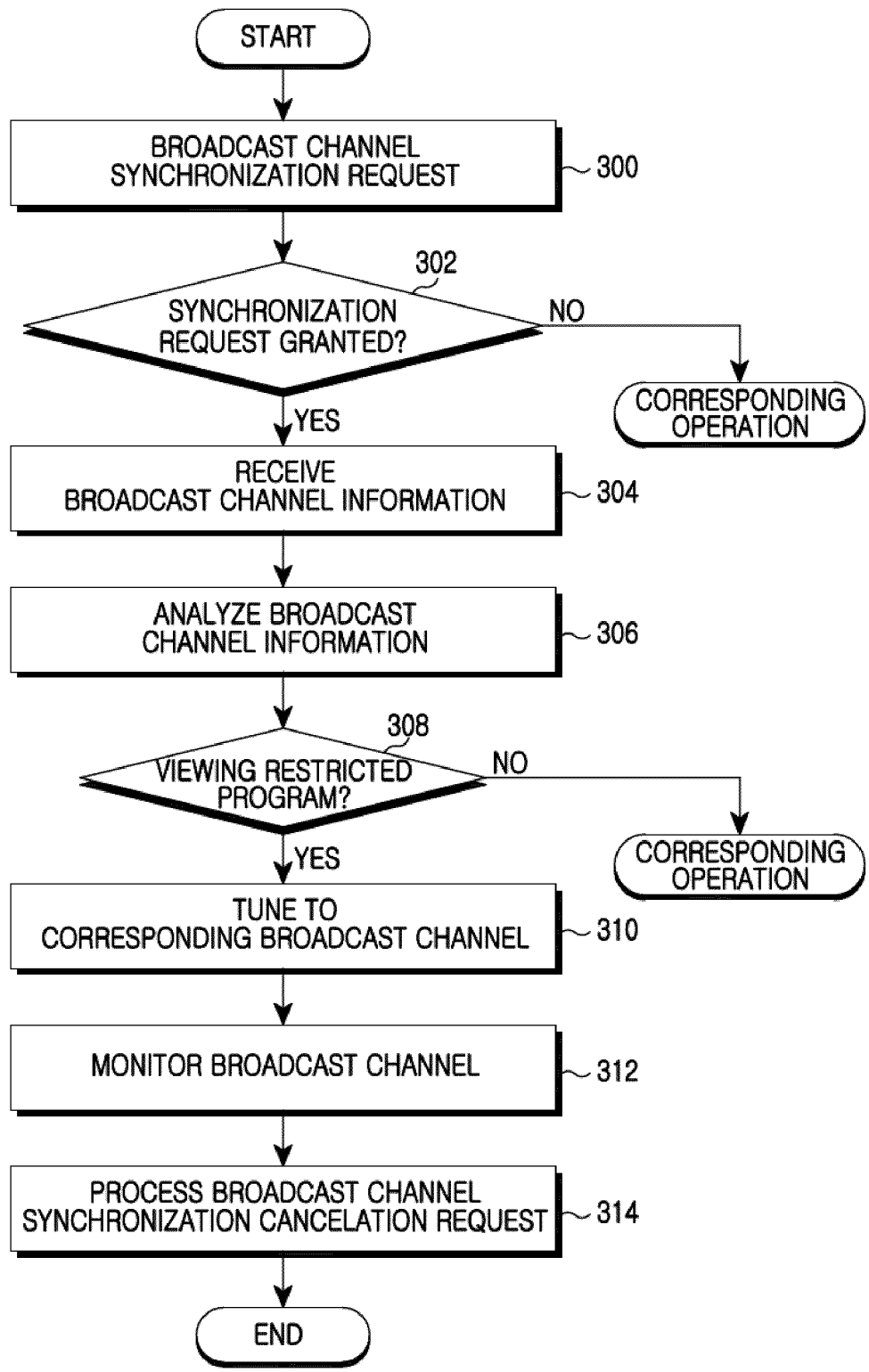
FIG. 3 illustrates an operation of an MS for broadcast channel synchronization according to an exemplary embodiment of the present invention.

FIG. 3 illustrates an operation of an MS for broadcast channel synchronization according to an exemplary embodiment of the present invention.

Referring to FIG. 3, the MS B 100 desiring broadcast channel synchronization sends a broadcast channel synchronization request SMS message to an MS A 150 viewing a DMB broadcast channel. If the MS A 150 grants the broadcast channel synchronization request in step 302, the MS B 100 proceeds to step 304 and receives a broadcast channel information SMS message from the MS A 150. The MS B 100 receives the broadcast channel information SMS message from the MS A 150 when synchronization is initiated. Thereafter, the MS B 100 may receive the broadcast channel information SMS message from the MS A 150 periodically and/or when there is a change of a broadcast channel viewed by the MS A 150. On the other hand, if the MS A 150 rejects the broadcast channel synchronization request, the MS B 100 performs a corresponding operation.

Then, in step 306, the MS B 100 analyzes the received broadcast channel information SMS message. In step 308, the MS B 100 determines if the MS A 150 is viewing a restricted program. The restricted program may be an age restricted program (e.g. a program intended to be viewed by someone older than a certain age), a viewing time restricted program, or any other type of restricted program.

If the MS A 150 is not viewing a restricted program in step 308, the MS B 100 performs a corresponding operation. On the other hand, if the MS A 150 is viewing a restricted program in step 308, the MS B 100 tunes to the broadcast channel viewed by the MS A 150.

Then, in step 312, the MS B 100 monitors the program viewed by the MS A 150 in real-time.

Then, in step 314, the MS B 100 processes a broadcast channel synchronization cancellation request. That is, the MS B 100 may send the broadcast channel synchronization cancellation request to the MS A 150 or vice versa.

Then, the MS B 100 terminates the procedure according to an exemplary embodiment of the present invention.

Figure 4:
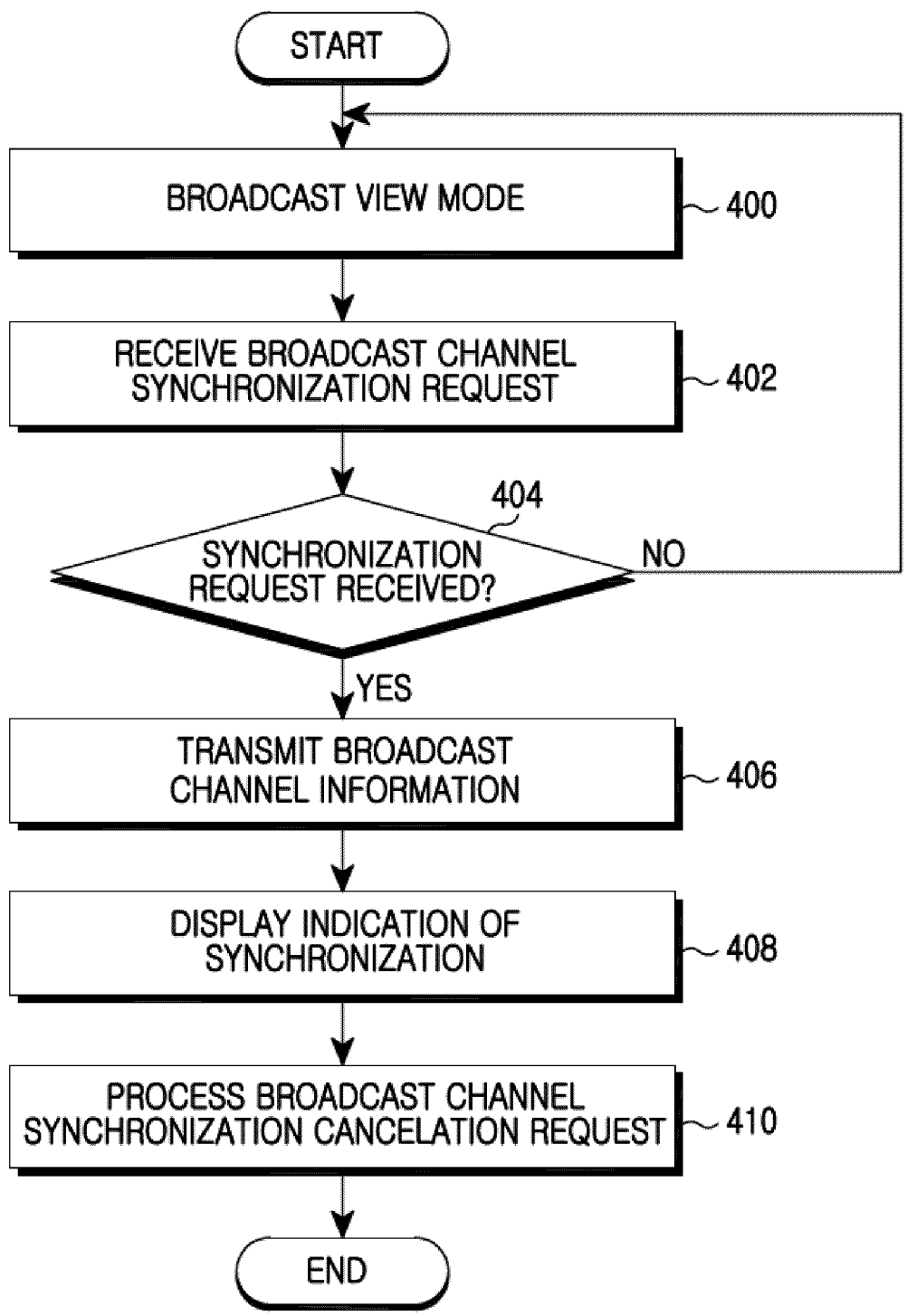
FIG. 4 illustrates an operation of an MS for broadcast channel synchronization according to an exemplary embodiment of the present invention.

FIG. 4 illustrates an operation of an MS for broadcast channel synchronization according to an exemplary embodiment of the present invention.

Referring to FIG. 4, in step 400, the MS A 150 views a broadcast channel in a broadcast view mode.

Then, in step 402, the MS A 150 receives a broadcast channel synchronization request SMS message from an MS B 100.

Then, in step 404, the MS A 150 determines whether to grant the broadcast channel synchronization request. If the broadcast channel synchronization request is not granted, the MS A 150 returns to step 400 and continues to view the broadcast channel in the broadcast view mode.

On the other hand, if the broadcast channel synchronization request is granted, the MS A 150 proceeds to step 406 and transmits information on a broadcast channel that is being viewed. Because the received broadcast channel synchronization request SMS message includes synchronization period and synchronization time setting information, the MS A 150 transmits the broadcast channel information depending on the values set in the synchronization period and synchronization time setting information. Further, the MS A 150 may thereafter transmit the broadcast channel information SMS message to the MS B 100 periodically and/or when there is a change of a broadcast channel viewed by the MS A 150.

Then, in step 408, the MS A 150 displays an indication that the MS B 100 is viewing the same broadcast channel being viewed by the MS A 150.

After that, in step 410, the MS A 150 processes a broadcast channel synchronization cancellation request. That is, the MS A 150 receives a broadcast channel synchronization cancellation request SMS message from the MS B 100. Alternatively, the MS A 150 sends a broadcast channel synchronization cancellation request SMS message to the MS B 100 and receives a grant/reject SMS message from the MS B 100 in response.

At this time, if the MS A 150 sends the broadcast channel synchronization cancellation request, upon receiving a responsive grant SMS message from the MS B 100, the MS A 150 discontinues transmitting a broadcast information (e.g., viewing history) SMS to the MS B 100 and, upon receiving a reject SMS message, continues to maintain broadcast channel synchronization.

Then, the MS A 150 terminates the procedure according to an exemplary embodiment of the present invention.

Figure 5:
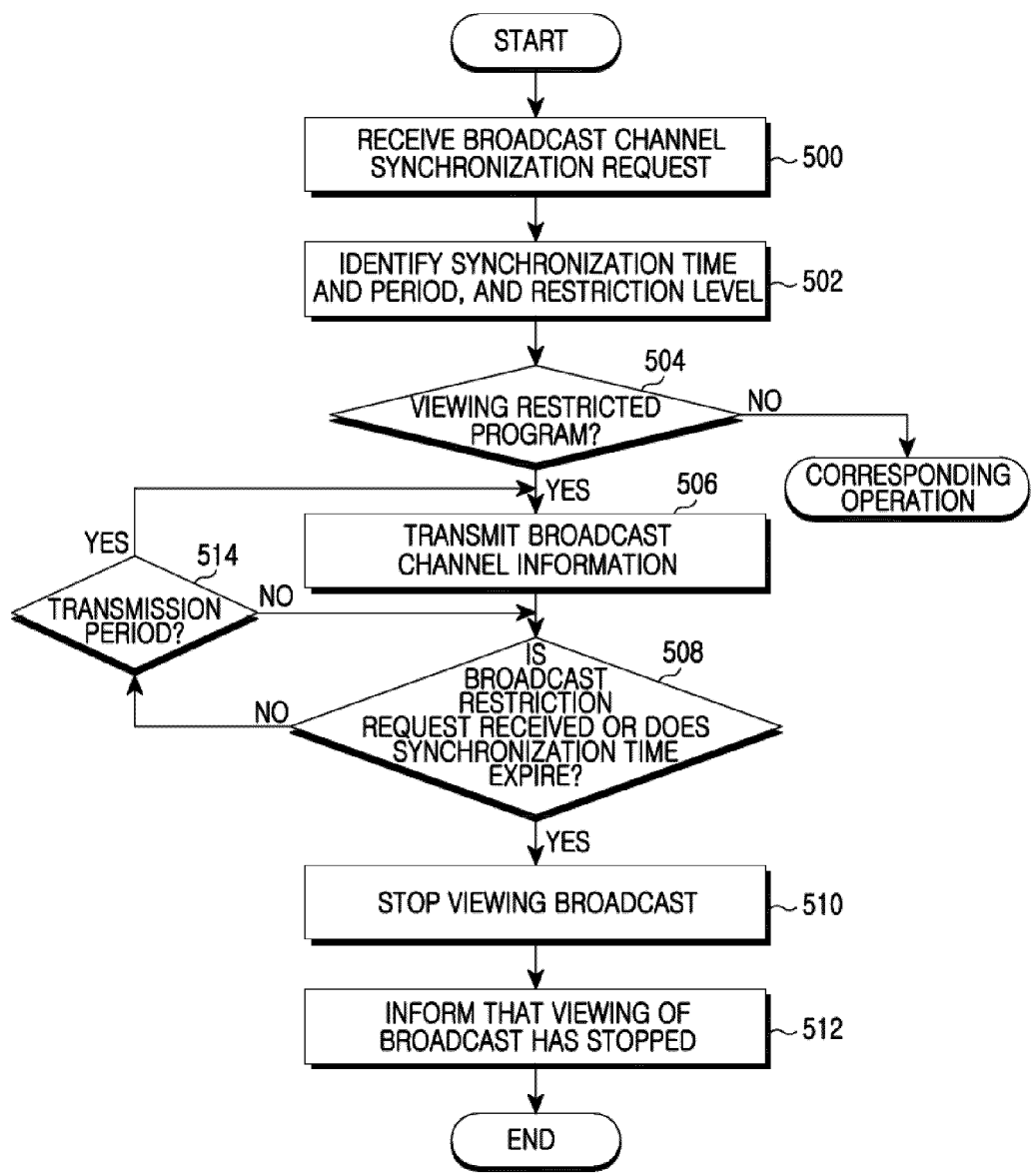
FIG. 5 illustrates an operation of an MS for broadcast channel synchronization according to an exemplary embodiment of the present invention.

FIG. 5 illustrates an operation of an MS for broadcast channel synchronization according to an exemplary embodiment of the present invention.

Referring to FIG. 5, in step 500, the MS A 150 that is viewing a program in a broadcast channel receives a broadcast channel synchronization request SMS message.

Then, in step 502, the MS A 150 identifies a synchronization time, period setting value and a view restriction setting value that are included in the broadcast channel synchronization request SMS message.

Then, in step 504, the MS A 150 identifies if a broadcast program viewed by the MS A 150 is a restricted program. The restricted program may be an age restricted program (e.g. a program intended to be viewed by someone older than a certain age), a viewing time restricted program, or any other type of restricted program. If the broadcast program is not a restricted program, the MS A 150 performs a corresponding operation. On the other hand, if the broadcast program is a restricted program, the MS A 150 proceeds to step 506 and provides the MS B 100 with information on a broadcast channel viewed by the MS A 150.

Then, if a broadcast restriction request is received or a synchronization duration expires in step 508, the MS A 150 proceeds to step 510 and stops viewing the broadcast. In step 512, the MS A 150 sends a notification to MS B 100 that the MS A 150 has stopped viewing the broadcast.

On the other hand, if the broadcast restriction request is not received or the synchronization duration does not expire, the MS A 150 proceeds to step 514 and identifies if it is a broadcast information transmission period. If it is the transmission period, the MS A 150 proceeds to step 506 and provides information on a broadcast channel that is being viewed.

The MS A 150 terminates the procedure according to an exemplary embodiment of the present invention.

As described above, in a procedure of broadcast channel synchronization between terminals for notifying of a channel change using an SMS message, in a synchronization handshake state (i.e., in a state where a synchronization request is performed and a responsive grant/reject SMS message is transmitted/received), channel information viewed in real-time in the MS A 150 is transmitted to the MS B 100 through the SMS message and, in the MS B 100, an SMS message is not displayed on a screen but is instead used in a synchronization mode to tune to a corresponding channel (i.e., a broadcast channel viewed by the MS A 150). However, the broadcast channel information may not be transmitted to the MS B 100 until one channel is viewed by the MS A 150 for a preset amount of time (e.g., 5 seconds). And, an indication of synchronization can be displayed on a broadcast screen. If handshaking is performed in a state where a restriction (such as on a viewing age) is set, channel information is transmitted through the SMS only when the restriction is violated and thus, the MS B 100 can monitor broadcasting viewed by the MS A 150.

FIGS. 1 to 5 illustrate exemplary embodiments of present invention of broadcast channel synchronization between two terminals. However, in another exemplary embodiment of the present invention, broadcast channel synchronization can be performed between a plurality of different MSs and the MS A 150 and thus, the plurality of MSs can monitor a broadcast channel viewed by the MS A 150.

Figure 6:
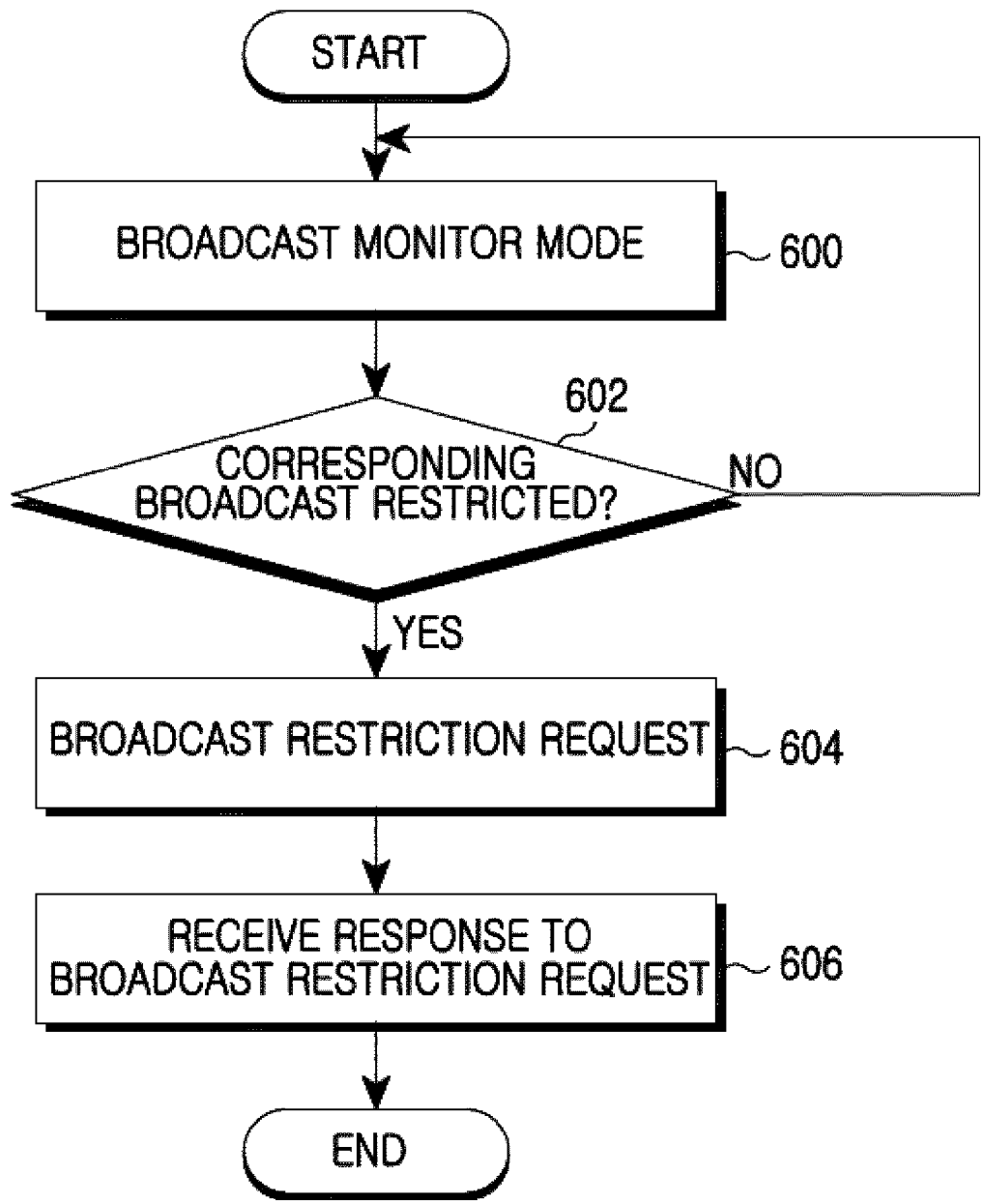
FIG. 6 illustrates an operation of an MS for restricting a viewing of a broadcast according to an exemplary embodiment of the present invention.

FIG. 6 illustrates an operation of an MS for restricting a viewing of a broadcast according to an exemplary embodiment of the present invention.

Referring to FIG. 6, in step 600, the MS B 100 monitors a broadcast channel viewed by an MS A 150 through broadcast channel synchronization, such as the broadcast channel synchronization of FIG. 1.

After that, if the MS B 100 determines that a broadcast viewed by the MS A 150 is improper and should be restricted in step 602, the MS B 100 proceeds to step 604 and sends a broadcast view restriction request SMS message to the MS A 150.

Then, the MS B 100 proceeds to step 606 and receives a notification of a broadcast restriction state from the MS A 150.

Then, the MS B 100 terminates the procedure according to an exemplary embodiment of the present invention.

Figure 7:
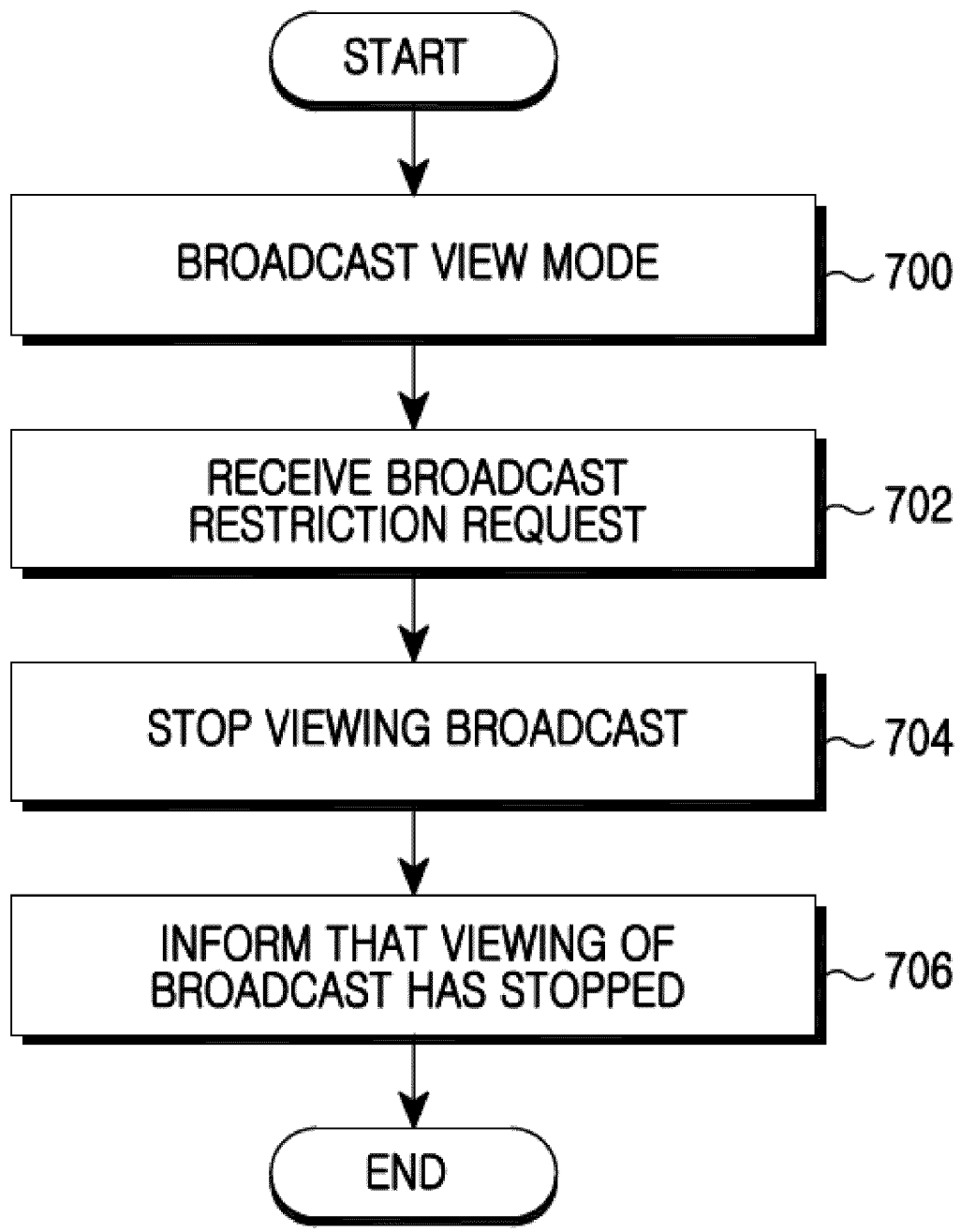
FIG. 7 illustrates an operation of an MS for restricting a viewing of a broadcast according to an exemplary embodiment of the present invention.

FIG. 7 illustrates an operation of an MS A 150 for restricting a viewing of a broadcast according to an exemplary embodiment of the present invention.

Referring to FIG. 7, in step 700, the MS A 150 views a broadcast channel monitored by an MS B 100 in a broadcast view mode.

Then, in step 702, the MS A 150 receives a broadcast restriction request command from the MS B 100 that is in a broadcast channel synchronization state.

After that, the MS A 150 proceeds to step 704 and stops viewing the broadcast. Thereafter, the MS A 150 proceeds to step 706 and sends a notification that the viewing of the broadcast has stopped to the MS B 100.

Then, the MS A 150 terminates the procedure according to an exemplary embodiment of the present invention.

Figure 8:
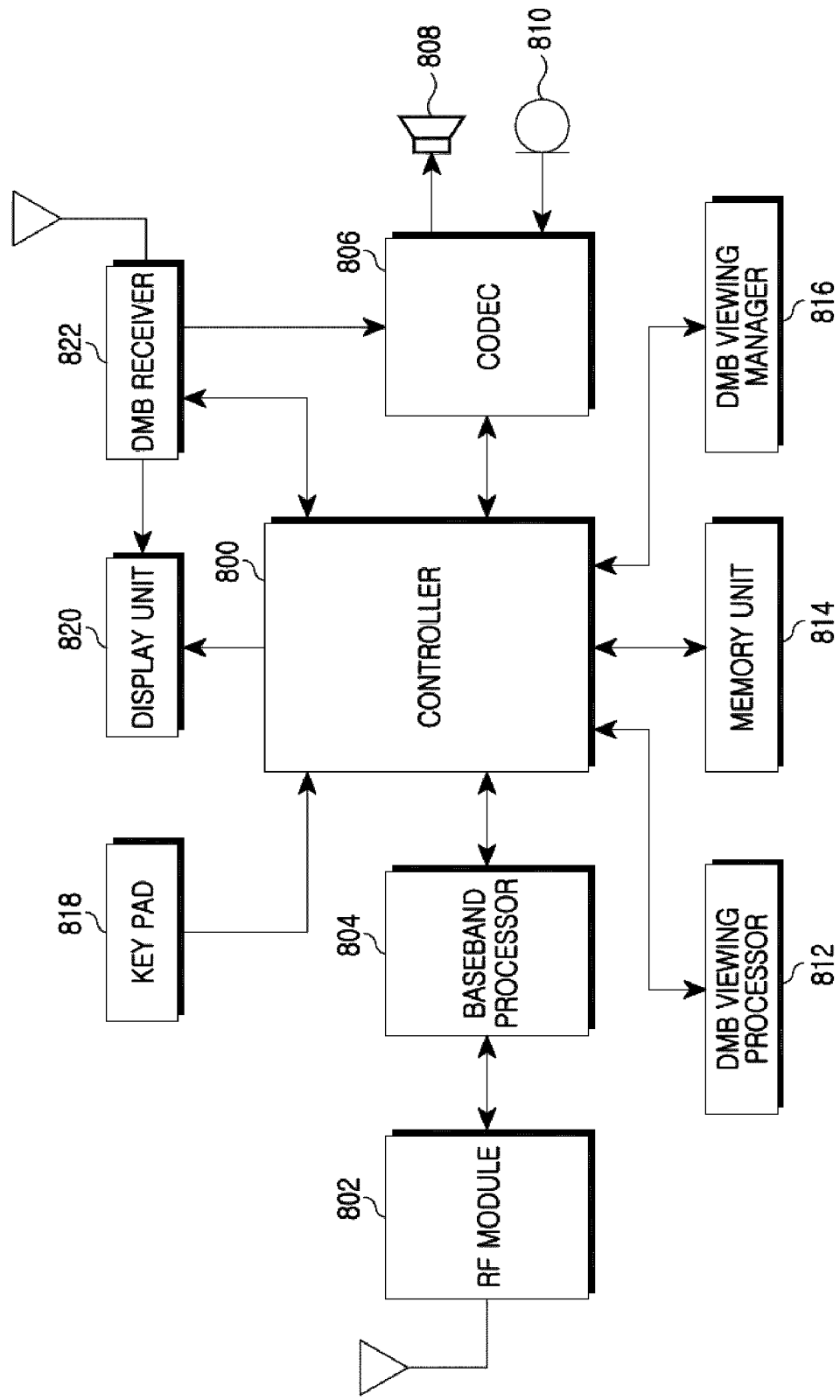
FIG. 8 illustrates a construction of a terminal for channel synchronization according to an exemplary embodiment of the present invention.

FIG. 8 illustrates a construction of a terminal for channel synchronization according to an exemplary embodiment of the present invention.

Referring to FIG. 8, the terminal includes a controller 800, a memory unit 814, a key pad 818, a display unit 820, a Radio Frequency (RF) module 802, a baseband processor 804, a COder/DECoder (CODEC) 806, a DMB receiver 822, a DMB viewing processor 812, a DMB viewing manager 816, a speaker 808, and a microphone 810.

The RF module 802 down-converts a frequency of an RF signal received through an antenna, and provides the down-converted signal to the baseband processor 804. The RF module 802 up-converts a frequency of a baseband signal from the baseband processor 804, and transmits the up-converted signal through the antenna. For example, in a transmission mode, the baseband processor 804 performs a function of channel-coding and spreading data to be transmitted. In a reception mode, the baseband processor 804 performs a function of de-spreading and channel-decoding a received signal.

The key pad 818 includes a plurality of function keys such as numeral keys '0' to '9', a menu key, a cancel key (delete), an OK key, a talk key, an end key, an Internet key, navigation keys (i.e., up/down/left/right keys), etc. The key pad 818 provides key input data corresponding to a key pressed by a user to the controller 800.

The display unit 820 displays state information generated during an operation of the terminal and a variety of moving pictures and still pictures, etc. The display unit 820 can be a color Liquid Crystal Display (LCD). In this case, the display unit 820 may include a controller for controlling the LCD, a video memory in which image data is stored and an LCD element. If the LCD is provided as a touch screen, the display unit 820 may perform a part or all of the functions of the key pad 818. In the present invention, the display unit 820 displays that broadcast channel synchronization between two terminals is in progress, by a symbol.

The memory unit 814 stores data (e.g., still picture and moving picture data, a character message, etc.) generated by a user or externally received, and an application program necessary for operations according to an exemplary embodiment of the present invention. The memory unit 814 stores the broadcast channel synchronization information (e.g., a broadcast channel synchronization request SMS, broadcast channel information, synchronization cancellation request information, etc.). Also, the memory unit 814 can also include one or more buffers for temporarily storing user data generated during the execution of the application program.

The controller 800 controls general operations of the terminal and a signal flow between internal elements. That is, the controller 800 controls a signal flow between respective constituent elements such as the memory unit 814, the key pad 818, the display unit 820, the RF module 802, the baseband processor 804, the codec 806, the DMB receiver 822, the DMB viewing processor 812, the DMB viewing manager 816, etc. The controller 800 can include the baseband processor 804.

The DMB receiver 822 receives DMB data. For example, the DMB receiver 822 selects a Code Division Multiplexing (CDM) channel corresponding to a broadcast channel selected by a user, and receives DMB data.

An operation of an MS B 100 sending a broadcast channel synchronization request is described below. The DMB viewing manager 816 sends a broadcast channel synchronization request to an MS A 150. When the MS A 150 grants the broadcast channel synchronization request, the DMB viewing manager 816 receives broadcast channel information from the MS A 150. Thereafter, the DMB viewing manager 816 may receive the broadcast channel information from the MS A 150 periodically and/or when there is a change of a broadcast channel viewed by the MS A 150. The DMB viewing manager 816 sends a broadcast channel synchronization cancellation request to the MS A 150.

The DMB viewing manager 812 is set to tune to a broadcast channel viewed by the MS A 150 using the received broadcast channel information of the MS A 150, and monitors the broadcast channel viewed by the MS A 150. The DMB viewing processor 812 receives a broadcast channel synchronization cancellation request from the MS A 150, and grants or rejects the channel synchronization cancellation request of the MS A 150.

In another exemplary implementation, the DMB viewing processor 812 sends a broadcast channel synchronization request to the MS A 150. When the MS A 150 grants the broadcast channel synchronization request, the DMB viewing processor 812 receives broadcast channel information from the MS A 150, and identifies if a broadcast channel viewed by the MS A 150 is a restricted program using the received broadcast channel information of the MS A 150.

If the broadcast channel viewed by the MS A 150 is a restricted program, the DMB viewing processor 812 is set to tune to the broadcast channel viewed by the MS A 150, and monitors the broadcast channel viewed by the MS A 150.

The DMB viewing processor 812 sends a broadcast channel synchronization cancellation request to the MS A 150. Alternatively, the DMB viewing processor 812 receives a broadcast channel synchronization cancellation request from the MS A 150, and grants or rejects the channel synchronization cancellation request of the MS A 150.

An operation of an MS A 150 sending a broadcast channel synchronization request is described below. While viewing a preferred broadcast channel, the DMB viewing manager 816 sends a broadcast channel synchronization request to the MS B 100. When the MS B 100 grants the broadcast channel synchronization request, the DMB viewing manager 816 transmits information on a broadcast channel that is being viewed. Thereafter, the DMB viewing manager 816 may transmit the broadcast channel information periodically and/or when there is a change of a broadcast channel being viewed. The DMB viewing manager 816 sends a broadcast channel synchronization cancellation request to the MS B 100, and receives a grant or rejection from the MS B 100 in response to the channel synchronization cancellation request. At this time, a rejection from the MS B 100 is received in response to the channel synchronization cancellation request, the DMB viewing manager 816 keeps transmitting the information on the broadcast channel that is being viewed. If a grant from the MS B 100 is received in response to the synchronization cancellation request, the DMB viewing manager 816 stops transmitting the information on the broadcast channel that is being viewed.

In another exemplary implementation, while viewing a preferred broadcast channel, the DMB viewing manager 816 sends a broadcast channel synchronization request to the MS B 100. If the broadcast channel that is being viewed is a restricted program, the DMB viewing manager 816 transmits information on the broadcast channel that is being viewed. When sending the broadcast channel synchronization request, the DMB viewing manager 816 identifies a restriction level of the broadcast channel that is being viewed. When a broadcast restriction request is received from the MS B 100 or a broadcast channel synchronization duration expires, the DMB viewing manager 816 stops the viewing of the broadcast, and sends a notification that the viewing of the broadcast has stopped to the MS B 100.

For the sake of convenience in description, FIG. 8 illustrates one example of a construction of a terminal used for operations according to an exemplary embodiment of the present invention, but this construction does not intend to limit the scope of the present invention. Thus, the terminal according to an exemplary embodiment of the present invention may further include a camera module, a Bluetooth module, etc.

Figure 9:
FIG. 9 illustrates a format of a Short Message Service (SMS) message for broadcast channel synchronization according to an exemplary embodiment of the present invention.

FIG. 9 illustrates a format of an SMS message for broadcast channel synchronization according to an exemplary embodiment of the present invention.

Referring to FIG. 9, a TID (Traffic ID) 900 is allocated for a DMB synchronization function, a TYPE 910 includes the type of synchronization request, channel synchronization, grant/rejection, etc., and a BODY 912 includes synchronization time and period setting values, synchronization channel/view level setting values, etc.

For example, if an MS A receives a set synchronization time value from an MS B, the MS A performs synchronization only from a synchronization granting time to the end of a synchronization time. If the MS A receives a set period value from the MS B, the MS A performs synchronization only during a set period (e.g., Monday to Wednesday, 20:00 to 24:00) from a synchronization granting time to the end of synchronization. If receiving a set synchronization channel/restriction level from the MS B, the MS A performs synchronization only when viewing the set synchronization channel and when viewing a program corresponding to the set restriction level.

In addition to channel synchronization, exemplary embodiments of the present invention set a new TID. Thus, the MS B can transmit a set value to the MS A, and the MS A can use the received set value.

As described above, the present invention has an advantage that, by synchronizing a broadcast channel, several MSs can view a broadcast viewed by one MS together in a remote place, and can monitor the broadcast viewed by a corresponding MS in real-time.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for broadcast channel synchronization by a first Mobile Station (MS) for synchronizing Digital Multimedia Broadcasting (DMB), the method comprising:
    sending a broadcast channel synchronization request message to a second MS, the broadcast channel synchronization request message including a synchronization time and period setting values;
    receiving a broadcast channel synchronization request grant message from the second MS;
    receiving information on a broadcast channel, from among a plurality of broadcast channels, viewed by the second MS, after the broadcast channel synchronization request grant message is received;
    tuning to the broadcast channel viewed by the second MS, based on the broadcast channel information received from the second MS; and
    displaying the broadcast channel viewed by the second MS.

2. The method of claim 1, further comprising sending a broadcast channel synchronization cancellation request to the second MS.

3. The method of claim 1, further comprising:
    receiving a broadcast channel synchronization cancellation request from the second MS; and
    one of granting and rejecting the channel synchronization cancellation request of the second MS.

4. The method of claim 1, further comprising displaying an indication that the second MS is being monitored.

5. The method of claim 1, wherein the broadcast channel synchronization request message comprises at least one of a synchronization time, a synchronization period, and view restriction information.

6. The method of claim 1, wherein, after the broadcast channel synchronization, the first MS does not display the broadcast channel information transmitted by the second MS, and tunes to the broadcast channel viewed by the second MS.

7. A method for broadcast channel synchronization by a first Mobile Station (MS) for synchronizing Digital Multimedia Broadcasting (DMB), the method comprising:
    sending a channel synchronization request message for viewing a restricted program to a second MS;
    receiving a broadcast channel synchronization request grant message from the second MS;
    receiving information on a broadcast channel viewed by the second MS, after broadcast channel synchronization;
    identifying if the broadcast channel viewed by the second MS includes the restricted program using the broadcast channel information of the second MS;

if the broadcast channel viewed by the second MS includes the restricted program, tuning to the broadcast channel viewed by the second MS; and
displaying the broadcast channel viewed by the second MS.

8. The method of claim 7, further comprising sending a broadcast channel synchronization cancellation request to the second MS.

9. The method of claim 7, further comprising:
receiving a broadcast channel synchronization cancellation request from the second MS; and
one of granting and rejecting the channel synchronization cancellation request of the second MS.

10. The method of claim 7, further comprising displaying an indication that the broadcast channel of the second MS is being monitored.

11. The method of claim 7, wherein the broadcast channel synchronization request message comprises at least one of a synchronization time, a synchronization period, and view restriction information.

12. The method of claim 7, wherein, after the broadcast channel synchronization, the first MS does not display the broadcast channel information transmitted by the second MS, and tunes to the broadcast channel viewed by the second MS.

13. A method for broadcast channel synchronization by a second Mobile Station (MS) for synchronizing Digital Multimedia Broadcasting (DMB), the method comprising:
receiving a broadcast channel synchronization request message from a first MS, the broadcast channel synchronization request message including a synchronization time and period setting values;
sending a broadcast channel synchronization request grant message; and
after broadcast channel synchronization, transmitting information on a broadcast channel, from among a plurality of broadcast channels, that is being viewed to the first MS.

14. The method of claim 13, further comprising receiving a broadcast channel synchronization cancellation request from the first MS.

15. The method of claim 13, further comprising:
sending a broadcast channel synchronization cancellation request to the first MS; and
receiving one of a grant and a rejection to the channel synchronization cancellation request from the first MS.

16. The method of claim 15, wherein, if receiving the rejection to the channel synchronization cancellation request from the first MS, the second MS continues transmitting the information on the broadcast channel that is being viewed and, if receiving the grant for the channel synchronization cancellation request from the first MS, the second MS stops transmitting the information on the broadcast channel that is being viewed.

17. The method of claim 13, further comprising displaying an indication that the first MS is monitoring the broadcast channel.

18. The method of claim 13, further comprising, when the broadcast channel is changed by a user, transmitting information on the changed broadcast channel to the first MS after a preset amount of time.

19. A method for broadcast channel synchronization by a second Mobile Station (MS) for synchronizing Digital Multimedia Broadcasting (DMB), the method comprising:
receiving a broadcast channel synchronization request message from a first MS;
sending a broadcast channel synchronization request grant message;

identifying a restriction level of a broadcast channel that is being viewed, after broadcast channel synchronization; and
if the broadcast channel that is being viewed includes a restricted program, transmitting information on the broadcast channel that is being viewed to the first MS.

20. The method of claim 19, further comprising:
if one of a broadcast restriction request is received from the first MS and a broadcast channel synchronization duration expires, stopping the viewing of the program being viewed; and
sending a notification that the viewing of the program has stopped to the first MS.

21. An apparatus for broadcast channel synchronization in a first Mobile Station (MS) for synchronizing Digital Multimedia Broadcasting (DMB), the apparatus comprising:
a DMB viewing manager for sending a broadcast channel synchronization request including a synchronization time and period setting values to a second MS and, when the second MS grants the broadcast channel synchronization request, for receiving information on a broadcast channel viewed by the second MS from the second MS; and
a DMB viewing processor for tuning to the broadcast channel, from among a plurality of broadcast channels, viewed by the second MS using the received broadcast channel information of the second MS, and for displaying the broadcast channel viewed by the second MS.

22. The apparatus of claim 21, wherein the DMB viewing manager sends a broadcast channel synchronization cancellation request to the second MS.

23. The apparatus of claim 21, wherein the DMB viewing manager receives a broadcast channel synchronization cancellation request from the second MS, and
one of grants and rejects the channel synchronization cancellation request of the second MS.

24. The apparatus of claim 21, further comprising a display unit for displaying an indication that the second MS is being monitored.

25. The apparatus of claim 21, further comprising, when sending the broadcast channel synchronization request to the second MS, the request comprises at least one of a synchronization time, a synchronization period, and view restriction information.

26. The apparatus of claim 21, wherein, after the broadcast channel synchronization, the DMB viewing processor does not display the broadcast channel information transmitted by the second MS, and tunes to the broadcast channel viewed by the second MS.

27. An apparatus for broadcast channel synchronization in a first Mobile Station (MS) for synchronizing Digital Multimedia Broadcasting (DMB), the apparatus comprising:
a DMB viewing manager for sending a broadcast channel synchronization request to a second MS and, when the second MS grants the channel synchronization request for viewing a restricted program, for receiving the broadcast channel information from the second MS, and for identifying if the broadcast channel viewed by the second MS is the restricted program using the received broadcast channel information of the second MS; and
a DMB viewing processor for, when the broadcast channel viewed by the second MS is the restricted program, tuning to the broadcast channel viewed by the second MS, and for displaying the broadcast channel viewed by the second MS.

28. The apparatus of claim 27, wherein the DMB viewing manager sends a broadcast channel synchronization cancellation request to the second MS.

29. The apparatus of claim 27, wherein the DMB viewing manager receives a broadcast channel synchronization cancellation request from the second MS, and one of grants and rejects the channel synchronization cancellation request of the second MS.

30. The apparatus of claim 27, further comprising a display unit for displaying an indication that the second MS is being monitored.

31. The apparatus of claim 27, wherein, when the broadcast channel is changed by a user, the DMB viewing manager receives information on the changed broadcast channel from the second MS after a preset time.

32. An apparatus for broadcast channel synchronization in a second Mobile Station (MS) for synchronizing Digital Multimedia Broadcasting (DMB), the apparatus comprising:
 a DMB viewing manager for, while viewing a broadcast channel, receiving a broadcast channel synchronization request message including a synchronization time and period setting values from a first MS, sending a grant message for the broadcast channel synchronization request, for performing broadcast channel synchronization, and for transmitting information on a broadcast channel that is being viewed from among a plurality of broadcast channels.

33. The apparatus of claim 32, wherein the DMB viewing manager receives a broadcast channel synchronization cancellation request from the first MS.

34. The apparatus of claim 32, wherein the DMB viewing manager sends a broadcast channel synchronization cancellation request to the first MS, and
 receives one of a grant and a rejection to the channel synchronization cancellation request from the first MS.

35. The apparatus of claim 32, wherein, if receiving the rejection to the channel synchronization cancellation request from the first MS, the DMB viewing manager continues transmitting information on a broadcast channel that is being viewed and, if receiving the grant for the channel synchronization cancellation request from the first MS, stops transmitting the information on the broadcast channel that is being viewed.

36. The apparatus of claim 32, further comprising a display unit for displaying an indication that the first MS is monitoring the broadcast channel.

37. An apparatus for broadcast channel synchronization in a second Mobile Station (MS) for synchronizing Digital Multimedia Broadcasting (DMB), the apparatus comprising:
 a DMB viewing manager for performing broadcast channel synchronization and, if a broadcast channel that is being viewed is a restricted program, transmitting information on the broadcast channel that is being viewed; and
 a DMB viewing processor for identifying a restriction level of the broadcast channel that is being viewed.

38. The apparatus of claim 37, wherein, if one of a broadcast restriction request is received from the first MS and a broadcast channel synchronization duration expires, the DMB viewing processor stops viewing of the broadcast, and sends a notification that the viewing of the broadcast has stopped to the first MS.

39. An operation method of a first Mobile Station (MS) for limiting Digital Multimedia Broadcasting (DMB), the method comprising:
 performing broadcast channel synchronization, and receiving broadcast channel information from a second MS;
 based on the broadcast channel information, tuning to a broadcast channel viewed by the second MS, and displaying the broadcast channel viewed by the second MS; and
 if the broadcast channel viewed by the second MS is a restricted program, sending a broadcast restriction command message to the second MS.

40. An operation method of a second Mobile Station (MS) for limiting Digital Multimedia Broadcasting (DMB), the method comprising:
 performing broadcast channel synchronization by sending a broadcast channel synchronization request message to a second MS, the broadcast channel synchronization request message including a synchronization time and period setting values, and by transmitting broadcast channel information to a first MS; and
 upon receiving a broadcast restriction command message from the first MS, stopping the viewing a broadcast channel that is being viewed.

\* \* \* \* \*